United States Patent [19]

von der Heide

[11] 4,187,456
[45] Feb. 5, 1980

[54] INCREMENTAL POSITIONING SYSTEM

[75] Inventor: Johann von der Heide, Mönchweiler, Fed. Rep. of Germany

[73] Assignee: Papst-Motoren KG, St. Georgen/Schwarzwald, Fed. Rep. of Germany

[21] Appl. No.: 843,784

[22] Filed: Oct. 19, 1977

[30] Foreign Application Priority Data

Oct. 22, 1976 [DE] Fed. Rep. of Germany ....... 2647956

[51] Int. Cl.² .............................................. G05B 5/01
[52] U.S. Cl. .................................. 318/616; 318/640; 250/231 SE
[58] Field of Search ...................... 318/640, 616, 618; 250/231 SE, 237 G; 324/175; 356/169, 375, 396

[56] References Cited
U.S. PATENT DOCUMENTS 3,811,091  5/1974  Ha et al. .............................. 324/175
3,839,665  10/1974  Gabor .................................. 318/616

Primary Examiner—Gene Z. Rubinson
Assistant Examiner—Eugene S. Indyk
Attorney, Agent, or Firm—Michael J. Striker

[57] ABSTRACT

A positioning motor is energized by an actuating signal which includes a component proportional to, and another component proportional to the time-derivative of the output signal of a displacement transducer. The displacement transducer includes a plurality of light detectors. A synchronizing structure coupled to the motor moves through the light paths of the light detectors, causing each to generate a respective one of a plurality of mutually phase-shifted first signal components. Signal-processing circuitry derives from the first signal components second signal components which are phase-shifted relative to the first signal components, and combines the first and second signal components to form the transducer output signal.

6 Claims, 4 Drawing Figures

INCREMENTAL POSITIONING SYSTEM

CROSS-REFERENCE TO RELATED APPLICATION

The present invention constitutes a modification of the incremental positioning system disclosed in my U.S. Pat. No. 4,042,863 issued Aug. 16, 1977. The entire disclosure of that patent is incorporated herein by reference.

BACKGROUND OF THE INVENTION

The present invention relates to the type of system disclosed in my earlier U.S. Pat. No. 4,042,863. In that system, a positioning motor is connected in a negative-feedback control network and, in dependence upon a speed signal and in dependence upon a displacement signal furnished by a displacement transducer, can be caused to stop at predetermined angular positions in the manner of a stepper motor, irrespective of whether the positioning motor is per se constructed as a stepper motor. A synchronizing diaphragm is coupled to the motor and moves through the light paths of a plurality of light detectors. In so doing, the synchronizing diaphragm causes each light detector to generate a respective signal component, the signal components being phase-shifted relative to each other or one another, and being combined to form the actual output signal of the displacement transducer system. In particular, the individual light detectors are individually activatable and are activated in sequences such that the individual signal components are combined to form the actual transducer-system output signal. The actuating signal applied to the positioning motor is derived from the transducer-system output signal, and includes a component proportional thereto and a component proportional to the time-derivative of the transducer-system output signal.

In this type of system, each of the signal components of the displacement transducer output signal corresponds to a different angular position to which the rotor of the positioning motor can be moved. The synchronizing diaphragm is provided with cyclically repeated circumferentially extending markings, and the density of angular spacing of the cyclically repeated markings determines the number of angular positions at which the rotor of the positioning motor can be stopped. In terms of production, limitations upon the density of such angular spacing place limits upon the number of selectable angular positions at which the positioning motor of the system can be stopped.

SUMMARY OF THE INVENTION

It is the general object of the invention to increase the number of positions at which the motor of the positioning system can be stopped, but without the necessity for an increase in the density of the spacing of the synchronizing information on the synchronizing structure of the system.

According to the present invention, this can be achieved by deriving from the signal components already being produced by the cooperating synchronizing structure and light detectors, and referred to now as first signal components, additional or second signal components which are phase-shifted relative to the first signal components, and by combining both the first and second signal components to form the actual output signal of the displacement transducer system.

Thus, without any change in the construction and arrangement of the synchronizing structure and of the light detectors, the number of angular positions at which the positioning motor of the system can be stopped is increased, in a particularly simple and inexpensive manner.

Preferably, the second signal components are so derived that, together with the first signal components, they form a set of signal components which differ from one another by equal successive increments of phase-shift. For example, if each signal component is a periodic waveform exhibiting a zero-throughpass, the zero-throughpasses of the set of signal components would be uniformly spaced, i.e., with respect to the angular position of the motor. As a result, the angular positions to which the motor could be moved would likewise be uniformly spaced.

The second signal components can be derived from the first signal components, in a particularly simple and inexpensive manner, by inverting the first signal components to form 180°-phase-shifted second signal components. Another particularly simple way of forming the second signal components is by summation of different combinations of the first signal components.

Preferably, the signal-processing means which forms the transducer-system output signal from the first and second signal components, does so by cyclical selection of individual ones of the first and second signal components for inclusion in the output signal of the displacement transducer system.

In the preferred embodiment of the invention, a routing circuit has a plurality of inputs for receipt of the individual first and second signal components and a single common output on which the output signal of the transducer system per se is furnished. Switches interconnecting the plural inputs and single common output are activated in cyclical sequences by means of a shift register or a ring counter.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
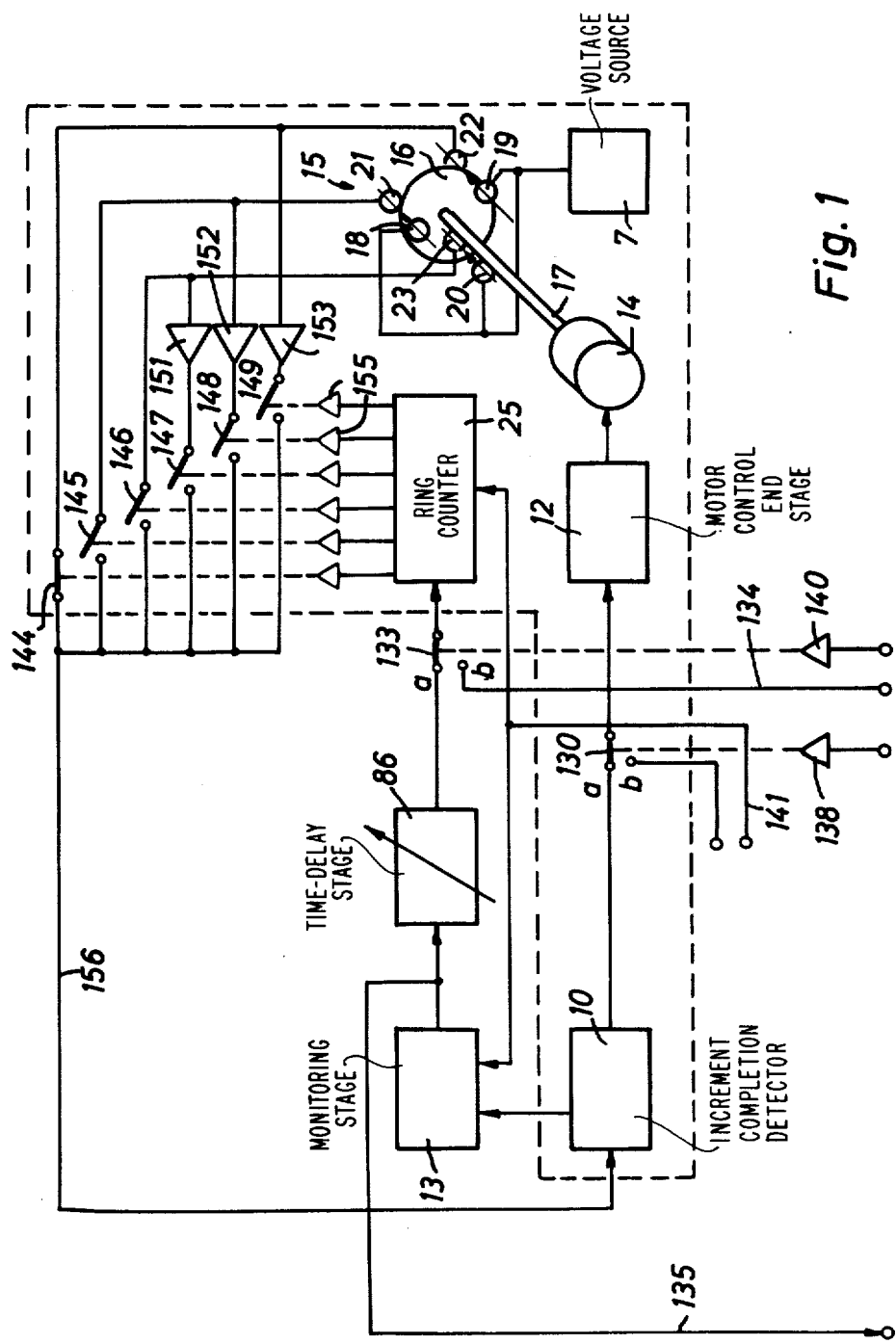
FIG. 1 is a block circuit diagram of an incremental positioning system, the displacement transducer of which is provided with three light detectors.

The part of the positioning system shown in FIG. 1 corresponds to what is shown in FIG. 11 of my U.S. Pat. No. 4,042,863, the entire disclosure of which is incorporated herein by reference. Components in FIG. 1 corresponding to those in FIG. 11 of my earlier patent are denoted by the same reference numerals; the remainder of the positioning system, i.e., the part thereof not shown in FIG. 1, is likewise disclosed in my earlier patent.

Corresponding to what is shown in FIG. 11 of my earlier patent, the part of the system shown in FIG. 1 herein includes a regulating stage which generates the actuating signal to be applied via an end stage 12 to a collectorless D.C. rotary positioning motor 14, and a monitoring stage 13 which receives from stage 10 information indicating the completion of each increment of motion by the motor 14 and furnishes at its output signals indicating that the next increment of motion is to be performed.

The displacement transducer system of the positioning system includes an optoelectronic transducer structure 15. Transducer structure 15 comprises three light-emitting diodes 18, 19, 20 and three cooperating phototransistors 21, 22, 23. The angular spacing between these three light transmitting and receiving units is 120°. A synchronizing disk 16 is mounted on the output shaft 17 of the motor 14, and moves between the LED's 18, 19, 20 and the phototransistors 21, 22, 23. The LED's 18, 19, 20 are energized from a voltage source 7, uninterruptedly.

The composition of the information provided on synchronizing disk 16 is disclosed in detail in my earlier patent, to which reference may be had for such details.

The phototransistors 21, 22, 23 are connected at their outputs to the inputs of respective electronic switches 144, 145, 146 directly, and also to the inputs of respective electronic switches 147, 148, 149 but through the intermediary of inverters 151, 152, 153.

The switches 144–149 are rendered conductive in a cyclical sequence by a ring counter or shift register 25, the six outputs of which are connected to the control inputs of respective ones of the switches 144–149 via intermediate stages 155.

The outputs of switches 144–149 are connected to a single common output line 156, upon which the output signal per se of the displacement transudcer system is produced. Depending upon which of switches 144–149 is rendered conductive, different ones of the signal components applied to the inputs of the switches are transmitted to line 156, for inclusion in the output signal of the displacement transducer system. The switches 144–149 are rendered conductive in sequence and cyclically, in synchronism with the sequence of increments of movement performed by the positioning motor 14.

The displacement transducer output signal on line 156 is applied to the input of stage 10, which derives therefrom, for application to motor 14 as the actuating signal therefor, a signal including a signal component proportional to and another signal component proportional to the time-derivative of the transducer output signal on line 156. This is explained in my aforementioned earlier patent.

Figure 2:
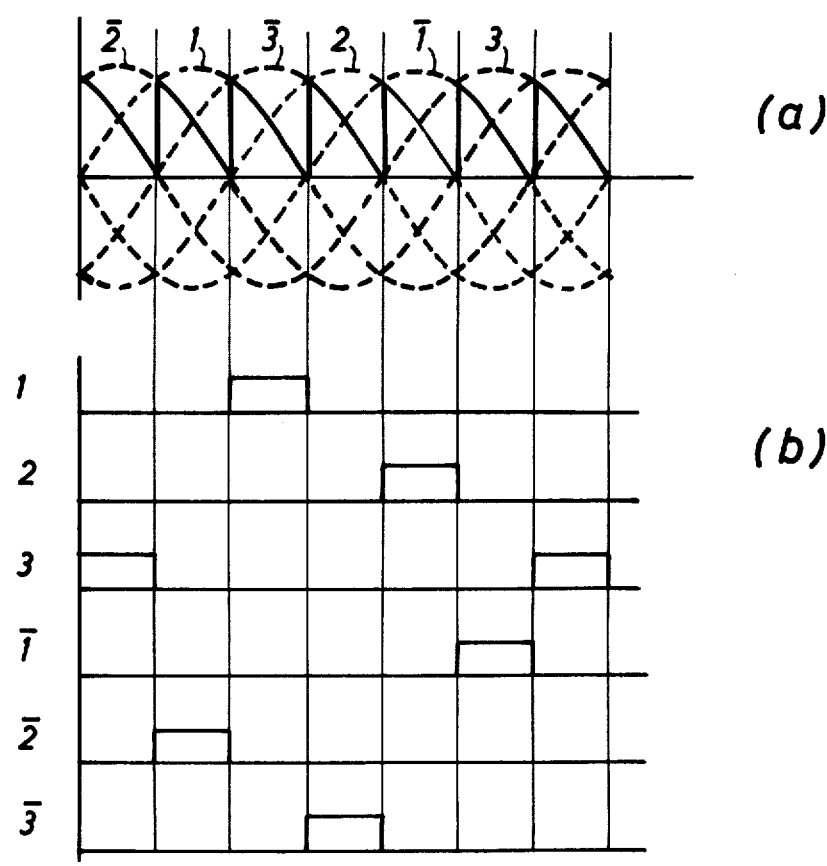
FIG. 2 depicts the three first signal components and the three second signal components generated in the system of FIG. 1, the actual output signal of the displacement transducer system, and the sequence in which the individual ones of the six signal components are selected for inclusion in the output signal of the displacement transducer system.

As the synchronizing disk 16 rotates, there are generated by the three phototransistors 21, 22, 23 respective ones of three first signal components. In FIG. 2(a), these three first signal components are, for quickness of visualization, shown as being sinusoidal, but can have different shapes, especially those disclosed in my earlier patent. These three first signal components, corresponding to the signal components in the system of my earlier patent, are denoted as components 1, 2 and 3 in FIG. 2(a).

The second three signal components are denoted by $\bar{1}, \bar{2}, \bar{3}$ in FIG. 2(a). They are derived from the first signal components by inversion, using the inverters 151, 152, 153, and therefore are 180°-phase-shifted relative to the first signal components 1, 2, 3.

In FIG. 2(a), the six signal components of the output signal of the displacement transducer system are shown, in general, in broken lines, but the portions thereof included within the transducer-system output signal per se are shown in solid lines.

The switches 144–149 are rendered conductive in the sequence indicated in FIG. 2(b), i.e., such that the output signal per se of the displacement transducer system is sequentially constituted by the six signal components $\bar{2}, 1, \bar{3}, 2, \bar{1}, 3$, in that or the reverse order. In particular, of the six sinusoidal signal components, it is the positive descending branches thereof which are sequentially selected for inclusion in the output signal of the displacement transducer system. During operation, the rotor of the motor 14 successively turns through equal increments of movement to successive angular positions corresponding to the zero-throughpass points of successive ones of the six signal components.

The construction and operation of the remainder of the part of the positioning system shown in FIG. 1 corresponds to what is shown in FIG. 11 of my earlier patent. By means of an electronic switch 130 and its activating stage 138, the end stage 12 can be selectably connected to the output of regulating stage 10 to effect position regulation of the motor or, alternatively (switch setting b), to the output of a direction-reversal stage capable of operating in a speed-regulated mode and also in an unregulated-speed mode. Connected between the monitoring stage 13 and the sequencing circuit 25 is a time-delay stage 86. An electronic switch 133 provided with an activating stage 140 makes it possible either to connect the input of sequencing circuit 25 to the monitoring stage 13 (for control in dependence upon the performance of increments of movement) or else (switch setting b) to a line 134 for receipt of externally furnished motion-increment command pulses. The "step performed" signal appearing at the output of monitoring stage 135 is transmitted via a line 135 to logic circuitry. A control line 141 makes it possible to reverse the sequence in which the switches 144–149 are rendered conductive, and thereby reverse the direction of operation of positioning motor 14.

Figure 3:
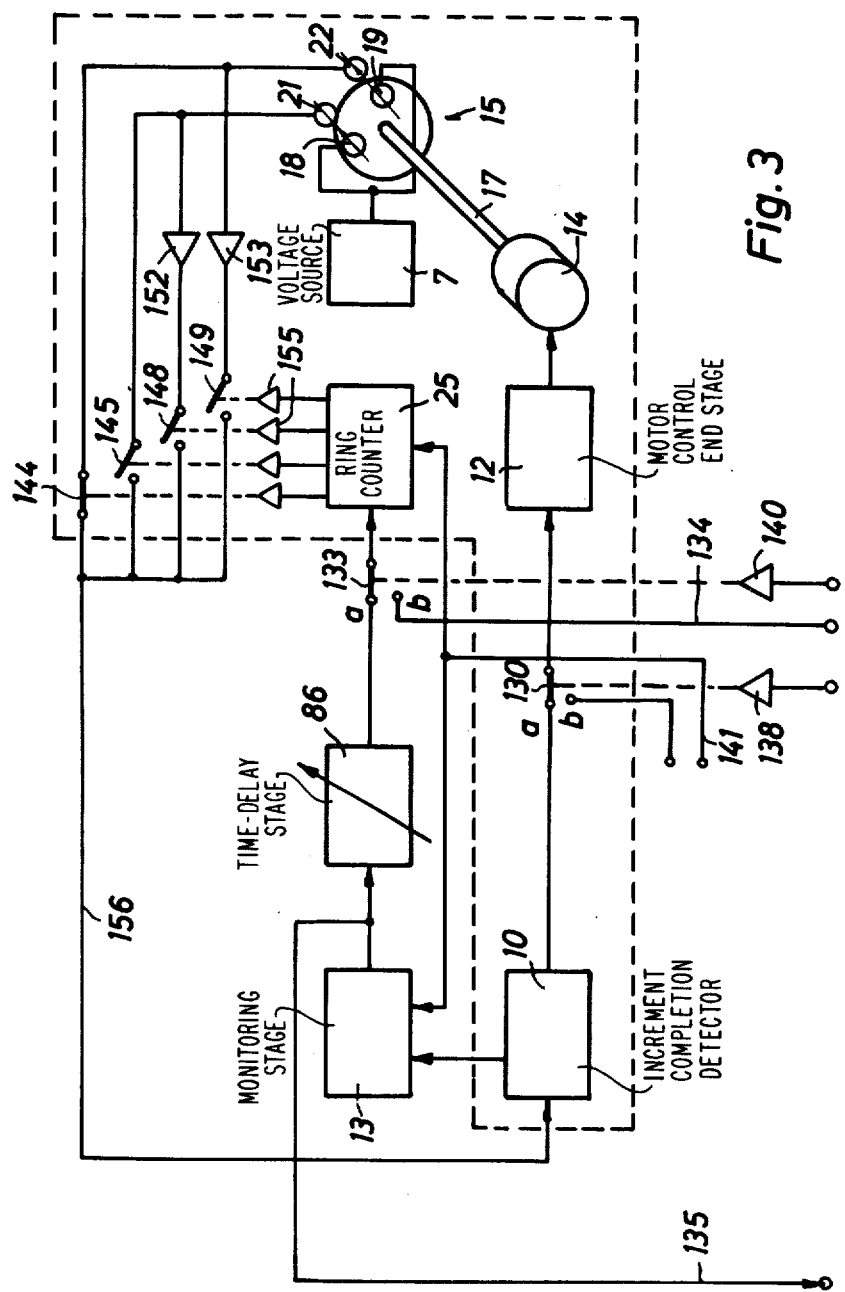
FIG. 3 depicts a system similar to that shown in FIG. 1, but including only two light detectors in its displacement transducer system.

In the embodiment depicted in FIG. 3, only two pairs of LED's 18, 19 and cooperating phototransistors 21, 22 are utilized. The first signal components, produced at the outputs of phototransistors 21, 22, are transmittable via respective switches 144, 145 to the common output line 156 for inclusion in the output signal per se of the displacement transducer system. Second signal components are again derived from the first by inversion, using inverters 152, 153, and are transmittable to the common output line 156 via respective switches 148 and 149.

Figure 4:
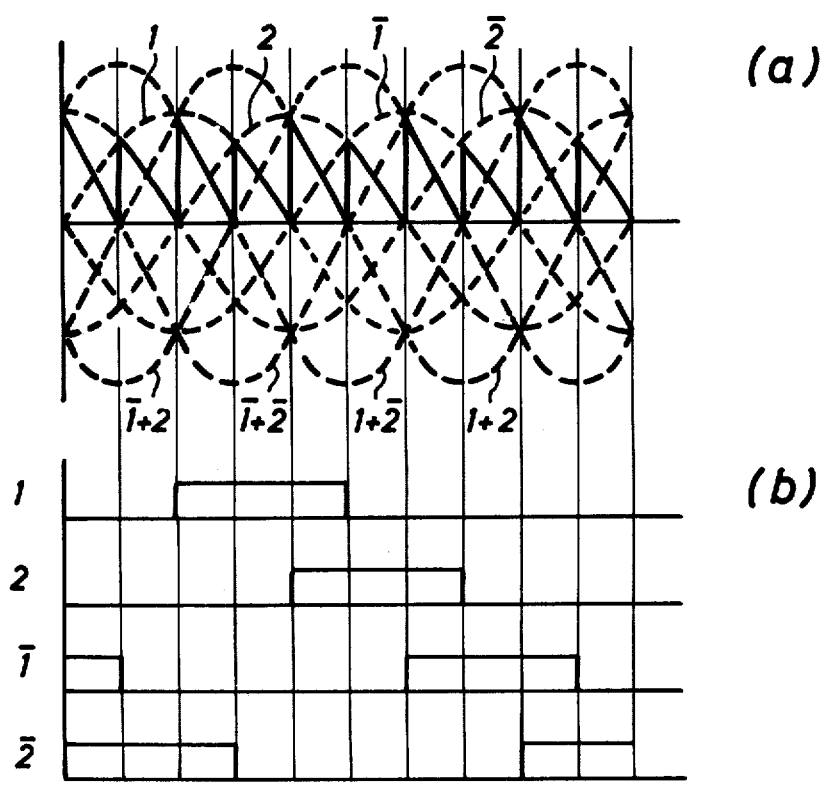
FIG. 4 depicts the signal components, transducer output signal, and signal-component selection sequence for the embodiment of FIG. 3.

In FIG. 4(a), the two first signal components are denoted by 1 and 2. The two second signal components, formed by inversion of the first signal components, are denoted by $\bar{1}$ and $\bar{2}$. The switches transmitting the four signal components 1, 2, $\bar{1}$, $\bar{2}$ are, in this embodiment, rendered conductive in a cyclical overlapping sequence, as shown in FIG. 2(b). The sequence in which the four switches are rendered conductive is such that during certain time intervals there are additionally formed summed signals 1+2, $\bar{1}$+2, 1+$\bar{2}$ and $\bar{1}$+$\bar{2}$. The output signal per se of the displacement transducer system is sequentially constituted by the signal component $\bar{1}$+$\bar{2}$; $\bar{2}$; 1+$\bar{2}$; 1; 1+2; 2; 2+$\bar{1}$; $\bar{1}$; and $\bar{1}$+$\bar{2}$, in that order, or in the reverse order for reverse motor operation.

This output signal per se is shown in FIG. 2(a) as the solid-line curve.

Thus, in the embodiment of FIG. 3, from two first signal components 1, 2 produced by photodetectors spaced apart by 90°, there are derived six second signal components (two by inversion, one by summation, and three by a combination of inversion and summation). Accordingly, the output signal per se of the displacement transducer system, appearing on common output line 156, is sequentially constituted by eight signal components.

In other respects, the embodiment of FIG. 3 operates in the same way as that of FIG. 1.

As can be seen in FIGS. 2(a), and 4(a), the first and second signal components together constitute a set of signal components which are phase-shifted relative to one another by equal successive increments of phase-shift; expressed in other words, corresponding points on the set of signal components (such as the 0° zero-throughpass points thereof) are uniformly spaced along the horizontal (position) axis.

It will be understood that each of the elements described above, or two or more together, may also find a useful application in other types of circuits and constructions differing from the types described above.

While the invention has been illustrated and described as embodied in a particular positioning system, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. In an incremental positioning system of the type including a positioning motor, an incremental-displacement transducer coupled to the positioning motor and operative for generating a transducer output signal comprised of periodic signal components indicating successive increments of displacement of the positioning motor, position-control means receiving the transducer output signal and operative for causing the positioning motor to become arrested upon completion of any of the positioning-motor displacement increments indicated by any of the periodic signal components of the transducer output signal by applying to the positioning motor an actuating signal derived from the transducer output signal and dependent upon a component proportional to the transducer output signal and a component proportional to the time-derivative of the transducer output signal, a novel incremental-displacement transducer, the novel incremental-displacement transducer comprising a plurality of light detectors; a synchronizing structure coupled to the positioning motor for movement therewith and moving through the light paths of the light detectors causing the light detectors to each generate a respective one of a plurality of mutually phase-shifted first periodic signal components; and signal-processing means operative for increasing the number of periodic signal components in the transducer output signal and thereby increasing the number of definite positions at which the position-control means can cause the positioning motor to become arrested by deriving from the first signal components second periodic signal components phase-shifted relative to the first signal components and combining the first and second signal components to form the transducer output signal.

2. In the system defined in claim 1, the signal-processing means comprising means operative for deriving from the first signal components second signal components such that the combined first and second signal components together constitute a set of signal components differing from one another by equal successive increments of phase shift.

3. In the system defined in claim 1, the signal-processing means including inverting means operative for deriving the second signal components from the first signal components by inverting the first signal components.

4. In a system as defined in claim 1, the signal-processing means including summing means operative for deriving the second signal components by summation.

5. In a system as defined in claim 1, the signal-processing means including means for forming the transducer output signal by cyclical selection of individual ones of the first and second signal components for inclusion in the transducer output signal.

6. In a system as defined in claim 5, the signal-processing means including routing means having a plurality of inputs in receipt of the first and second signal components and a single common output upon which the transducer output signal is furnished and a plurality of switching means interconnecting the plurality of inputs to the single common output, and cyclically operative activating means operative for activating the switching means in cyclical succession.

* * * * *